(12) United States Patent
Hagemeier

(10) Patent No.: US 10,232,764 B2
(45) Date of Patent: Mar. 19, 2019

(54) CIRCUIT FOR OPERATING A PLURALITY OF LIGHTING DEVICES OF A MOTOR VEHICLE

(71) Applicant: Hella KGaA Hueck & Co., Lippstadt (DE)

(72) Inventor: Bernd-Ulrich Hagemeier, Lippstadt (DE)

(73) Assignee: Hella KGaA Hueck & Co., Lippstadt (DE)

( * ) Notice: Subject to any disclaimer, the term of this patent is extended or adjusted under 35 U.S.C. 154(b) by 0 days.

(21) Appl. No.: 15/722,597

(22) Filed: Oct. 2, 2017

(65) Prior Publication Data

US 2018/0022267 A1 Jan. 25, 2018

Related U.S. Application Data

(63) Continuation of application No. PCT/EP2016/056877, filed on Mar. 30, 2016.

(30) Foreign Application Priority Data

Apr. 2, 2015 (DE) .................. 10 2015 105 162

(51) Int. Cl.
*B60Q 1/14* (2006.01)
*B60Q 1/18* (2006.01)
(Continued)

(52) U.S. Cl.
CPC ............ *B60Q 1/1407* (2013.01); *B60Q 1/18* (2013.01); *B60Q 1/24* (2013.01); *B60Q 11/002* (2013.01);
(Continued)

(58) Field of Classification Search
CPC ...... H05B 37/029; B60Q 1/1407; B60Q 1/18; B60Q 1/24; B60Q 11/002
See application file for complete search history.

(56) References Cited

U.S. PATENT DOCUMENTS 5,780,795 A 7/1998 O'Reilly
2002/0047648 A1* 4/2002 Belliveau ............ H04N 9/3141
315/312

(Continued)

FOREIGN PATENT DOCUMENTS

DE 103 55 046 B4 6/2005
DE 10 2005 055 009 A1 5/2007
(Continued)

OTHER PUBLICATIONS

International Search Report dated Mar. 30, 2016 (English Translation).

*Primary Examiner* — Dylan C White
(74) *Attorney, Agent, or Firm* — Muncy, Geissler, Olds & Lowe, P.C.

(57) ABSTRACT

A circuit arrangement for operating a plurality of lighting devices having: a first control component, which is connected to a first lighting device or is formed integrally with a first lighting device; at least one second control component, which is connected to a second lighting device or is formed integrally with a second lighting device; at least one main control device, which is connected to the first and to the second control component and is configured to supply the control components with an operating voltage; and at least one data communications line, which is connected to the two control components and to the main control device. The main control device is is able to transmit a first position coding signal for the position coding of the first control component and at least one second position coding signal for the position coding of the second control component.

20 Claims, 1 Drawing Sheet

(51) Int. Cl.
    *B60Q 1/24*         (2006.01)
    *B60Q 11/00*      (2006.01)
    *H05B 37/02*      (2006.01)
    *B60R 16/03*      (2006.01)

(52) U.S. Cl.
    CPC ....... *H05B 37/029* (2013.01); *H05B 37/0254* (2013.01); *B60R 16/03* (2013.01)

(56) References Cited

U.S. PATENT DOCUMENTS

| | | | |
|---|---|---|---|
| 2002/0145394 A1* | 10/2002 | Morgan | H04L 29/12254 315/291 |
| 2008/0136334 A1* | 6/2008 | Robinson | H05B 37/0254 315/151 |
| 2008/0203928 A1* | 8/2008 | Frumau | H05B 37/0272 315/151 |
| 2011/0035404 A1* | 2/2011 | Morgan | H05B 37/029 707/769 |
| 2013/0093324 A1* | 4/2013 | Brown | B60Q 1/1407 315/77 |
| 2017/0050555 A1* | 2/2017 | Chen | B60Q 1/0076 |
| 2017/0318647 A1* | 11/2017 | Vangeel | G06F 8/654 |

FOREIGN PATENT DOCUMENTS

| | | | | |
|---|---|---|---|---|
| EP | 2 591 952 A2 | 5/2013 | | |
| EP | 2591952 A2 * | 5/2013 | ............ | B60Q 1/143 |
| KR | 100 922 235 B1 | 10/2009 | | |
| WO | WO 2015/036912 A1 | 3/2015 | | |

\* cited by examiner

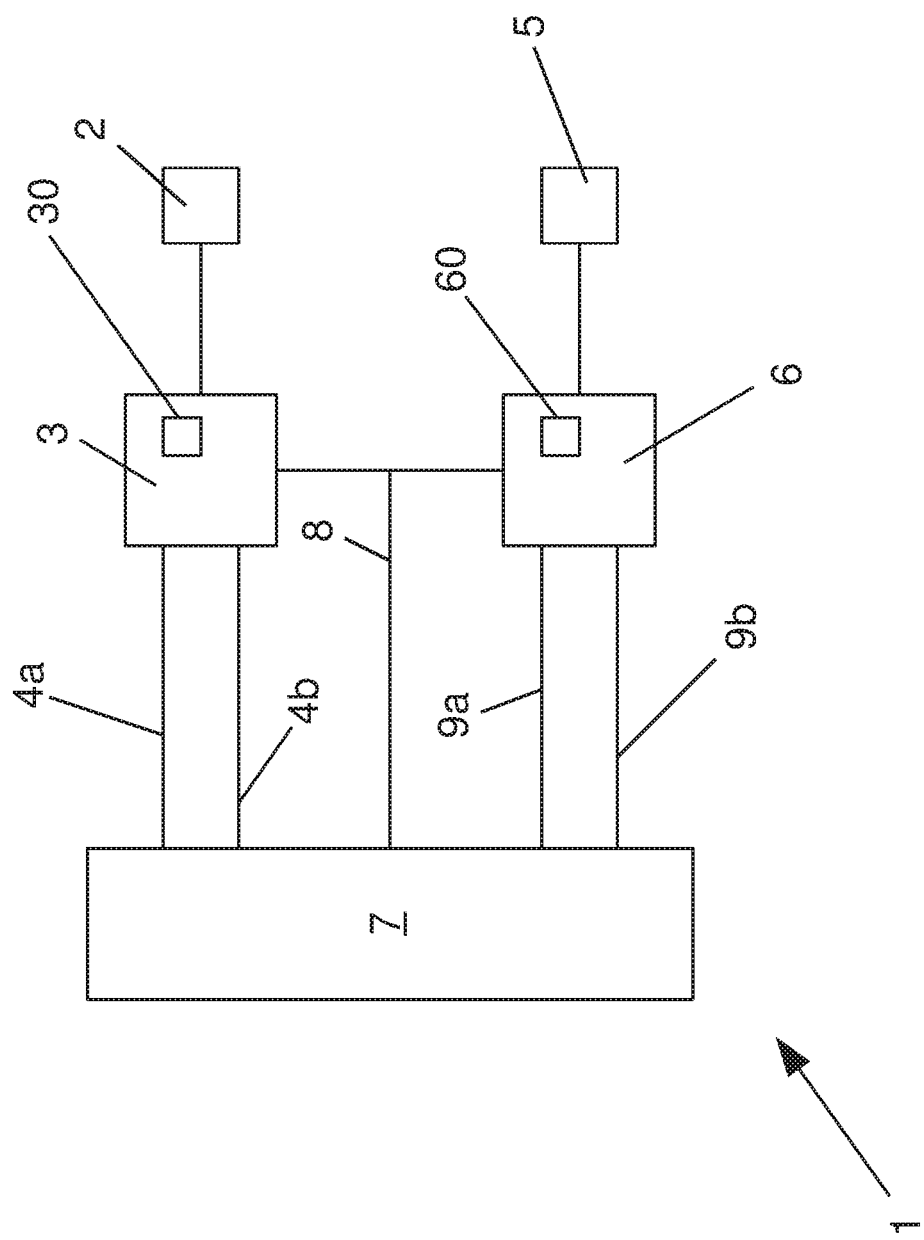

CIRCUIT FOR OPERATING A PLURALITY OF LIGHTING DEVICES OF A MOTOR VEHICLE

This nonprovisional application is a continuation of International Application No. PCT/EP2016/056877, which was filed on Mar. 30, 2016, and which claims priority to German Patent Application No. 10 2015 105 162.1, which was filed in Germany on Apr. 2, 2015, and which are both herein incorporated by reference.

BACKGROUND OF THE INVENTION

Field of the Invention

The present invention relates to a circuit arrangement for operating a plurality of lighting devices of a motor vehicle, comprising a first control component, which is connected to a first lighting device or is integrally formed with a first lighting device; at least one second control component, which is connected to a second lighting device or is integrally formed with a second lighting device; at least one main control device, which is connected to the first and to the second control component and is configured to supply the control components with an operating voltage; and at least one data communications line, which is connected to the two control components and to the main control device. Moreover, the present invention relates to a method for position coding of a first control component and at least one second control component of such a circuit arrangement. The subject matter of the present invention is further a method for checking the position coding of at least one control component of such a circuit arrangement.

Description of the Background Art

In a front area and in a rear area, motor vehicles have at least two lighting devices. These lighting devices, respectively arranged at the left or right of the front and rear areas of the motor vehicle, supply different lighting functions. The two lighting devices arranged in the front area, spaced apart from each other and disposed in the transverse direction of the vehicle, provide among other things illumination of the roadway and can in particular generate low beam and high beam light distribution with increased illumination range. The light distribution generated by these two lighting devices during operation differ from each other, in particular in order to avoid blinding oncoming vehicles as much as possible. In addition, further lighting functions, such as turn signal functions or adaptive front lighting functions, can be integrated in the two front lighting devices. The two lighting devices arranged in the rear area, spaced apart from one another and disposed in the transverse direction of the vehicle, form vehicle tail lights. Moreover, additional lighting functions, such as a turn signal function, a brake light or a rear fog light function can be integrated into the rear lighting devices. Each of the lighting devices is respectively connected to a control component or has a control component integrated therein. These control components are connected to a main control device, from which they are supplied with an operating voltage. In this case, it is fundamentally possible to provide only a single main control device that is associated with the lighting devices in the front and rear areas of the vehicle. Alternatively, two main control devices may be provided, one of which is associated with the lighting devices in the front area of the motor vehicle, and the other with the lighting devices in the rear area.

Because of the sometimes different lighting functions and light distributions, it is important that it is possible to accurately identify which of the lighting devices arranged in the front or the rear area of the motor vehicle are located on the right or on the left. To date, the control components have a hardware coding that can be configured in particular as a plug pin, by means of which lighting devices arranged on the right or the left of the vehicle can be assigned. The control components are programmed accordingly during manufacture.

SUMMARY OF THE INVENTION

It is therefore an object of the present invention to provide a circuit arrangement of the aforementioned type which allows for a simple and inexpensive manner of assigning the control components to the lighting devices arranged on the right or the left of the motor vehicle. Another object of the invention is to provide a method for position coding a first control component and at least one second control component of such a circuit arrangement, which allows for easy assignment of the control components to the lighting devices arranged on the right or the left of the motor vehicle. The invention is also based on the object of providing a method that is simple to carry out for checking the position coding of at least one control component of such a circuit arrangement.

In an exemplary embodiment, a circuit arrangement is provided in that the main control device is configured such that it can transmit a first position coding signal for position coding the first control component, and at least one second position coding signal for position coding the second control component via the data communications line to the control components. The inventive circuit arrangement advantageously allows for simple position coding of the control components and thus also of the lighting devices of the motor vehicle connected thereto. Hardware coding of the control components, which is often realized by a plug pin in the prior art, is no longer required, so that the circuit arrangement can be produced at lower cost. In the context of the invention, it is for example possible to provide a single main control device, which is associated with the control components of the lighting devices in the front and rear areas of the motor vehicle. Alternatively, two main control devices can also be provided, one of which is associated with the control components of the lighting devices in the front area and the other with the control components of the lighting devices in the rear area of the motor vehicle.

In an embodiment, it is provided that each of the control components includes a storage, within which as a function of the position coding signal received, a position coding information is retrievably stored. This allows for permanent storage of the position coding information. Preferably, the storage may be formed as a non-volatile, rewritable storage so that the possibility of recoding the control components is provided. An embodiment of the storage as a volatile storage is also generally possible.

In an embodiment, it is possible that each of the control components is configured such that it can transmit the position coding information stored in its storage via the data communications line to the main control device. This enables, for example, a review of the position coding of the control devices by means of the main control device already during position coding, or after completion of all position codings, or after completion of assembly. Incorrect coding or accidental swapping of the position-coded control devices during assembly can be reliably detected in this way.

For example, the main control device and the control components may be configured such that the position coding information of the control components can be retrieved by the main control device and transmitted by the control components to the main control device. This provides an error check while the circuit arrangement is being operated.

In an embodiment, it is proposed that the control components are configured such that the position coding information stored in the storage can be transmitted by the control components to the main control device at fixed or definable time intervals. This creates the possibility of automatically checking the position codings of the control devices by means of the main control device, during operation and at specified time cycles.

In an embodiment, it is provided that the data communications line is configured as a bus line. The bus line can in particular be a CAN bus line or a LIN bus line.

An inventive method for position coding a first control component and at least one second control component of a circuit arrangement is provided that includes the steps of:
a) providing the first control component with an operating voltage,
b) transmitting a first position coding signal from a main control device to the first control component,
c) storing a first position coding information in a storage of the first control component,
d) interrupting the supply of the first control component with the operating voltage,
e) supplying the second control component with an operating voltage,
f) transmitting a second position coding signal from the main control device to the second control component,
g) storing a second position coding information in a storage of the second control component.

The inventive method advantageously allows for simple and cost effective position coding of the control components, and therefore also of the lighting devices of the motor vehicle connected to said components. This method allows for omission of hardware coding of the control components, which in the prior art is often realized by a plug pin.

In an embodiment, it is possible that in steps c) and g), the position coding information is also transmitted from the respective control component to the main control device. In this way, an immediate review of the position coding during the coding process of the control components is made possible.

An inventive method for checking the position coding of at least one control component of a circuit arrangement is provided that includes the steps of:
a') supplying at least one of the control components with an operating voltage,
b') transmitting a position coding information of the at least one control component, which is supplied with the operating voltage, to a main control device,
c') comparing the transmitted position coding information with a target position of the control component.

This method enables a simple and reliable checking of the position coding of at least one of the control components and the lighting devices connected thereto. This ensures reliable detection of possible incorrectly coded control components. Error checking during operation is made possible in an advantageous manner.

In an embodiment, it is proposed that each of the control components is supplied with an operating voltage and the position coding information of the control components are transmitted to the main control device and compared with the target positions of the control components. This variant advantageously allows for checking the position codings of all coded control components of the circuit arrangement and also simplifies error detection.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which is given by way of illustration only, and thus, is not limitive of the present invention, and wherein the sole FIGURE illustrates an example embodiment, showing a circuit arrangement for operating a plurality of lighting devices of a motor vehicle, said arrangement being configured according to a preferred embodiment of the present invention.

DETAILED DESCRIPTION

A circuit arrangement 1 for operating a plurality of lighting devices 2, 5 of a motor vehicle, which is configured according to a preferred embodiment of the present invention, comprises a first control component 3, which is connected to a first lighting device 2, and a second control component 6, which is connected to a second lighting device 5. Here, the first lighting device 2 constitutes a front lighting on the left, as seen in the direction of travel of the motor vehicle, and the second lighting device constitutes a front lighting on the right, as seen in the direction of travel of the motor vehicle.

Furthermore, the circuit arrangement 1 comprises a main control device 7, which is connected via two electric supply lines 4a, 4b to the first control component 3, and via two electrical supply lines 9a, 9b to the second control component 6. The main control device 7 and the two control components 3, 6 for the lighting devices 2, 5 are in communication with each other via a data communications line 8, which can in particular be formed as a bus line. Preferably, the bus line is constructed as a CAN bus line or a LIN bus line.

The circuit arrangement 1 is formed such that, without the use of additional hardware coding, in particular of one of the plug pins provided at the control components 3, 6, it enables coding of the first lighting device 2 as the left front lighting, and coding of the second lighting device 5 as the right front lighting of the motor vehicle, via respective position codings of the control components 3, 6 that are associated with said lights.

Below, a corresponding method for position coding of the first control component 3, which is associated with the first lighting device 2, and the second control component 6, which is associated with the second lighting device 5, will be explained. First, the electric power supply of the two control components 3, 6 is deactivated so that neither of the two control components 3, 6 are supplied with an electrical operating voltage. To code the left front lighting of the motor vehicle, the electrical supply of the first control component 3 is then activated in a first process step via the electric power lines 4a, 4b, so that an operating voltage is applied.

At the second control component 6, no operating voltage is applied. Via the data communications line 8, a first position coding signal ("program left") is transmitted from the main control device 7 to the first control component 3. The first control component 3 has a non-volatile, for example, rewritable, storage 30, in which a first position coding information is stored in a retrievable manner, that the first control component 3 of the first lighting device 2 is assigned to the left front lighting of the motor vehicle. Via the data communications line 8, preferably the first position coding information ("left coded"), in particular in the form of a coding acknowledgment signal, can be transmitted from the first control component 3 to the main control device 7.

Subsequently, the main control device 7 interrupts the electrical supply of the first control component 3 with the operating voltage. Both control components 3, 6 are subsequently not supplied with an operating voltage for a certain time interval T, which length is chosen such that it is ensured that the first control component 3 cannot perform any more data communication via the data communications line 8.

In a next step, the electrical supply of the second control component 6 is activated to code the right front lighting of the motor vehicle so that said component is supplied with an operating voltage via the two electrical supply lines 9a, 9b. The already coded first control component 3 is, however, not supplied with an operating voltage. Via the data communications line 8, a second position coding signal ("program right") is transmitted from the main control device 7 to the second control component 6. The second control component 6 also has a non-volatile, for example, rewritable, storage 60, in which a second position coding information is stored, that the second control component 6 is assigned to the second lighting device 5, which is provided for the right front lighting of the motor vehicle. Via the data communications line 8, a second position coding information ("right coded") is transmitted from the second control component 6 to the main control device 7.

In this way, both control components 3, 6 are coded correctly and are unambiguously assigned to the first and second lighting device 2, 5, which constitute the left or right front lighting of the motor vehicle. In an analogous manner, it is also possible to code a first and a second lighting device in the rear area of the motor vehicle.

By means of the circuit arrangement 1 described here, continuous error analysis is possible even while the motor vehicle is being operated. In the embodiment shown here, the first control component 3 is configured for this purpose such that it transmits the position coding information ("coded left") to the main control device 7 either cyclically or in response to a request "read position coding" transmitted via the data communications line 8, which is stored in the storage 30. The second control component 6 is configured analogously such that it transmits the position coding information ("coded right") to the main control device 7 either cyclically or in response to a request "read position coding" transmitted via the data communications line 8, which is stored in the storage 60. This way, the main control device 7 detects the presence of the two control components 3, 6 and their stored position coding information, which is associated with the first or second lighting device 2, 5.

If the main control device 7, for example, only receives the position coding information "left coded", this suggests that, for example, the second control component 6 coded for the right side is defective or that not only the first control component 3, but also the second control component 6 is incorrectly coded for the left side. This may have occurred, for example, during repair by installing a second control component 6 which was previously coded for the left side. The main control device 7 is able to detect this error and can transition to an error mode if needed. The main control device 7 may preferably be configured such that in case of failure, it attempts to reprogram the relevant control component 3, 6. In this way, the type of error (defective or incorrect coding) can be reliably detected.

If, for example, in the event of a repair, the first control component 3, which is coded for the left front lighting, was accidentally installed on the right side of the vehicle, and the second control component 6, which is coded for the right front lighting, was installed on the left side of the vehicle, this error would not be, or at best be very difficult to recognize during normal operation. The present circuit arrangement 1 is able to reliably recognize even an error of that type. It is for example possible that with each supply voltage cycle, at first only the power supply for one of the two control devices 3, 6 is activated. Then, the position coding information retrievably stored in the storage 30, 60, of the control device 3, 6, which is supplied with the operating voltage, is transmitted to the main control device 7 via the data communications line 8. If the position coding information read in this way correctly matches an expected target position, the circuit arrangement 1 is operated in a normal operating mode. If the position coding information does not match the expected target position, the circuit arrangement 1 can switch to a defined error mode or try to recode the incorrectly coded control device 3, 6.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A circuit arrangement for operating a plurality of lighting devices of a motor vehicle, the circuit arrangement comprising:
    a first control component that is connected to a first lighting device or is integrally formed with the first lighting device;
    at least one second control component that is connected to a second lighting device or is integrally formed with the second lighting device;
    at least one main control device that is connected to the first and to the second control component and is configured to supply the control components with an operating voltage; and
    at least one data communications line that is connected to the two control components and to the main control device,
    wherein the main control device is configured to transmit a first position coding signal to the position coding of the first control component and at least one second position coding signal to the position coding of the second control component via the data communications line to the control components,
    wherein the first control component is configured to transfer a first position coding information to the at least one main control device as an acknowledgement of the received first position coding signal, and
    wherein the at least one second control component is configured to transfer a second position coding information to the at least one main control device as an acknowledgement of the received second position coding signal.

2. The circuit arrangement according to claim 1, wherein each of the control components comprises a storage within which as a function of the received position coding signal, the position coding information is retrievably stored.

3. The circuit arrangement according to claim 2, wherein the main control device and the control components are configured such that the position coding information stored in the storage of the control components is retrieved by the control components and transmitted from the control components to the main control device.

4. The circuit arrangement according to claim 2, wherein the control components are configured such that the position coding information stored in the storage is transmitted at a fixed or a definable time interval from the control components to the main control device.

5. The circuit arrangement according to claim 4, wherein the at least one main control device is configured to:
   compare the position coding information received from the control component with a target position of the control component; and
   reprogram the control component to match the target position of the control component when the received position coding information does not match the target position of the control component.

6. The circuit arrangement according to claim 1, wherein the data communications line is a bus line.

7. The circuit arrangement according to claim 1, wherein the at least one main control device is configured to:
   provide the first control component with the operating voltage and not provide the at least one second control component with the operating voltage when the main control device transmits the first position coding signal to the first control component; and
   provide the at least one second control component with the operating voltage and not provide the first control component with the operating voltage when the main control device transmits the at least one second position coding signal to the at least one second control component.

8. The circuit arrangement according to claim 1, wherein the at least one main control device is configured to transmit a request for read position coding to the first and to the at least one second control component,
   wherein the first control component is configured to transmit the first position coding information to the at least one main control device in response to the received request for the read position coding,
   wherein the at least one second control component is configured to transmit the second position coding information to the at least one main control device in response to the received request for the read position coding, and
   wherein at least one main control device is configured to:
      compare the first position coding information received from the first control component with a target position of the first control component, and reprogram the first control component to match the target position of the first control component when the received first position coding information does not match the target position of the first control component; and
      compare the second position coding information received from the at least one second control component with a target position of the at least one second control component, and reprogram the at least one second control component to match the target position of the at least one second control component when the received second position coding information does not match the target position of the at least one second control component.

9. A method for position coding of a first control component and of at least one second control component of a circuit arrangement, the method comprising:
   providing the first control component with an operating voltage;
   transmitting a first position coding signal from a main control device to the first control component;
   storing a first position coding information in a storage of the first control component;
   transferring a first position coding information from the first control element to the main control device as an acknowledgement of the received first position coding signal;
   interrupting the supply of the first control component with the operating voltage;
   supplying the second control component with the operating voltage;
   transmitting a second position coding signal from the main control device to the second control component;
   storing a second position coding information in a storage of the second control component; and
   transferring a second position coding information from the second control element to the main control device as an acknowledgement of the received second position coding signal.

10. The method according to claim 9, wherein the first control component is provided with the operating voltage and the at least one second control component is not provided with the operating voltage when the main control device transmits the first position coding signal to the first control component, and
   wherein the at least one second control component is provided with the operating voltage and the first control component is not provided with the operating voltage when the main control device transmits the at least one second position coding signal to the at least one second control component.

11. A method for checking a position coding of at least one control component of a circuit arrangement, the method comprising:
   supplying, by the main control device, at least one of the control components with an operating voltage;
   transmitting a position coding information from the at least one control component that is supplied with the operating voltage, to a main control device;
   comparing, at the main control device, the transmitted position coding information with a target position of the control component.

12. The method according to claim 11, wherein each of the control components is supplied with the operating voltage, and
   wherein the position coding information of the control components is transmitted from the control components to the main control device and is compared at the main control device with the target positions of the control components.

13. The method according to claim 11, wherein each of the control elements is supplied with the operating voltage one at a time such that when the at least one control element transmits the position coding information to the main control device, the at least one control element is provided with the operating voltage and no other control element is provided with the operating voltage.

14. The method according to claim 11, further comprising:

reprogramming the control component to match the target position of the control component when the position coding information transmitted from the control component does not match the target position of the control component.

15. A circuit arrangement for operating a plurality of lighting devices of a motor vehicle, the circuit arrangement comprising:
   a plurality of control components connected to or integrally formed with a corresponding plurality of lighting devices; and
   a main control device connected to the plurality of control components over a data communication line,
   wherein for each control component of the plurality of control components, the main control device is configured to program the control component by transmitting a position coding signal associated with the control component to the control component over the data communication line, and
   wherein each control component of the plurality of control components is configured to:
      receive the position coding signal associated with the control component from the main control device over the data communication line; and
      transmit an acknowledgment of the received position coding signal back to the main control device over the data communication line.

16. The circuit arrangement according to claim 15, wherein for each control component of the plurality of control components being programmed, the main control device is configured to activate the control component and deactivate all other control components.

17. The circuit arrangement according to claim 15, wherein the acknowledgement of the received position coding signal is position coding information related to the received position coding signal, and wherein each control component of the plurality of control components is configured to store the position coding information to a storage of the control component.

18. The circuit arrangement according to claim 15, wherein the main control device is configured to send a request for read position coding over the data communication line to a control component of the plurality of control components,
   wherein in response to the request for read position coding received from the main control device, the control component is configured to transmit the position coding information over the data communication line to the main control device, and
   wherein the main control device is further configured to:
      compare the position coding information received from the control component to a target position of the control component; and
      reprogram the control component to match the target position of the control component when the received position coding information does not match the target position of the control component.

19. The circuit arrangement according to claim 18, wherein when the main control device sends the request for read position coding to the control component, the main control device is configured to activate the control component and deactivate all other control components.

20. The circuit arrangement according to claim 15, wherein during normal operation, each control component of the plurality of control components is configured to periodically transmit its position coding information over the data communication line to the main control device, and
   wherein when the main control device does not receive the position coding information associated with at least one control component, the main control device is configured to enter into an error mode.

* * * * *